Patented Dec. 9, 1924.

1,518,626

UNITED STATES PATENT OFFICE.

CHARLES W. WHITLEY, OF SALT LAKE CITY, UTAH, ASSIGNOR TO AMERICAN SMELTING AND REFINING COMPANY, OF NEW YORK, N. Y., A CORPORATION OF NEW JERSEY.

TREATMENT OF COPPER-LEAD MATTE.

No Drawing. Application filed May 18, 1921. Serial No. 470,657.

*To all whom it may concern:*

Be it known that I, CHARLES W. WHITLEY, a citizen of the United States, and resident of Salt Lake City, in the county of Salt Lake and State of Utah, have invented certain new and useful Improvements in Treatment of Copper-Lead Matte, of which the following is a specification.

The invention relates in general to the treatment of copper lead matte and specifically relates to an improved process for the treatment of such matte for the concentration of the contained copper, gold and silver values and for the separation therefrom of the contained lead. The matte to be treated and particularly referred to in this disclosure is known as the first copper lead matte, which usually contains from two per cent to fifteen per cent copper; from eight per cent to twenty per cent lead and various quantities varying from traces to considerable percentages of other metals.

Heretofore it has been usual in the treatment of such matte to granulate it and first rough roast to approximately thirteen per cent sulphur. This product is then mixed with raw ores or other material and is subjected to a blast roast to produce a sintered product in which the sulphur content is reduced to about two per cent. This sintered product is then treated to recover the valuable metals.

There are numerous objections to this method among which may be mentioned: The double roast is expensive; large percentages of coke and scrap iron are necessary for the reduction of the contained lead bullion; the large production of coppery lead entails expensive treatment of the dross; there is produced a slag of low silica content which is costly, as the iron and lime have to be purchased as barren flux; the high lead and copper content of the slag results in the loss of metal values; and, finally, the resulting matte may still contain approximately twenty per cent of lead.

The primary object of this invention is to provide a commercially practical process for treating this copper lead matte which will avoid the objections present in the methods now practiced and which in general will provide an economical separation of the contained metals without contamination, without harmful effect on the apparatus and without the necessity of re-treating the products.

The improved method consists in crushing the matte by granulating or grinding to a suitable fineness,—for example, through a four-mesh screen. This granulated product is then pre-roasted in a suitable mechanical furnace such as the Wedge or McDougal type so as to reduce the sulphur content. It is preferable to continue the roasting until the sulphur is carried to a point where the amount remaining in the calcines is approximately the same or three per cent lower than the copper present although it has been found that with some kinds of ore the percentage of sulphur may remain equal to or slightly higher than the percentage of copper without impairing the efficiency of the process.

To the calcines preferably after cooling are added crushed or finely divided lime bearing material and silicious ores, which may contain copper, lead, gold or silver values. The amount of ore and lime bearing material added will depend upon their chemical composition and the quantities necessary to produce a balanced charge. As an illustration, in one instance of successful practical operation the re-agents were added in such amounts that the resultant slag assayed approximately 40% to 50% silica, 20% to 40% iron oxide, and 10% to 20% lime. There is then added to the ore charge from ten to twenty per cent by weight of reducer fuel, preferably in a finely divided condition, and the whole thoroughly mixed.

The mixture is charged into a suitable furnace,—for example, a reverberatory furnace of standard construction—and is smelted at a temperature in the smelting zone of approximately 1550° to 1600° C. The furnace may be fired by oil fuel, by powdered coal or in any other well known manner.

The lead and most of the zinc present are reduced to the metallic state by the finely divided carbon of the reducing material. At the smelting temperature maintained these metals are volatilized but immediately after being distilled from the surface of the charge they burn to oxides, as the atmosphere of the furnace is slightly oxidizing.

The gases carrying the lead fume in suspension may then be cooled in any well known manner and the lead collected in a suitable manner as by passing the fume through a bag house or through a Cottrell plant. The fume recovered consists mainly of oxide and basic sulphate of lead and oxide of zinc. Arsenic and antimony are also volatilized, thus eliminating these impurities which would otherwise seriously affect the refining of the blister copper.

The process permits the smelting of a large tonnage of silicious ores carrying either copper, lead, gold or silver values and giving a high percentage recovery of these metals. It is necessary that the ores carry considerable excess silica. The silicious ores in the charge serve a double purpose. The roasting process has converted most of the iron sulphide of the matte to iron oxide and the silica is added to form a fusible silicate of iron. This operation results in the concentration of copper and the collection of the gold and silver in the resulting matte. The silicious ores also act as a "stiffener" to the charge on account of the high fusing point of silicious ore which smelts slowly and difficultly thereby, relaying the normal rate of the smelting action to an extent permitting time for the reduction and volatilization of the lead.

Owing to the strong reduction which exists in the charge proper due to the excess of reducing fuel the slag or waste material is remarkably free from metal values. In one instance this product assayed approximately forty per cent copper with three to four per cent lead.

By means of the process herein outlined certain advantages are attained. For instance, blast roasting is eliminated and a cheaper grade of fuel can be used. A slag high in silica is produced, thus saving the expense of buying and smelting a large amount of iron flux. The slag loss of valuable metals is practically eliminated. The lead is separated from the copper in one smelting operation, and the resulting copper is substantially free from contaminating impurities.

Having thus described my invention, I claim:

1. The process of treating copper lead matte containing iron and other metals to remove the lead, which consists in roasting the matte to reduce the sulphur content below the copper content of the charge, adding silicious material in quantity sufficient to slag the iron, and subjecting the mixture in the presence of a reducing fuel to a smelting temperature.

2. The process of treating copper lead matte containing iron and other metals to remove the lead, which consists in roasting the matte until the sulphur content is lower than the copper content of the charge, adding silicious material in quantity sufficient to retard the rate of smelting and to form silicates with the iron and permit the lead and other volatile substances to form a fume, and subjecting the mixture in the presence of reducing material to a smelting temperature.

3. The process of treating copper lead matte containing iron and other metals to remove the lead which consists in crushing and roasting the matte to remove a substantial proportion of the sulphur and adding sufficient reducing material to reduce the lead and silicious material in quantity sufficient to retard the normal rate of smelting.

4. The process of treating copper lead matte to remove the lead which consists in subjecting the crushed matte to a pre-roast to reduce the sulphur content, adding reducing fuel and lime bearing material and supplying silicious material in quantity sufficient to retard the rate of smelting and to form a difficultly fusible silicate slag, and subjecting the mixture to a smelting temperature.

5. In the art of treating copper lead matte the process, which consists in treating the matte to remove a portion of the sulphur and then smelting the matte with 10% to 20% by weight of reducing material and with silicious ores in quantity sufficient to delay the smelting action and permit the reduction and volatilization of the lead.

6. In the art of treating copper lead matte the process which consists in mixing the matte when partially free from sulphur with lime bearing material and finely divided reducing fuel, together with an excess of crushed silicious ores to delay the smelting action and permit reduction and volatilization of the lead.

7. In the art of treating copper-lead matte, the process which consists in grinding the matte, pre-roasting the granulated matte to reduce the sulphur content, adding to the matte so treated a mixture of a crushed lime bearing material, silicious ores and a reducer fuel and subjecting the mixture to a smelting operation at a temperature of approximately 1600° C.

Signed at New York in the county of New York and State of New York this 14th day of May A. D. 1921.

CHARLES W. WHITLEY.